(12) United States Patent
Sheridan

(10) Patent No.: US 11,773,786 B2
(45) Date of Patent: *Oct. 3, 2023

(54) FUNDAMENTAL GEAR SYSTEM ARCHITECTURE

(71) Applicant: Raytheon Technologies Corporation, Farmington, CT (US)

(72) Inventor: William G. Sheridan, Southington, CT (US)

(73) Assignee: RTX CORPORATION, Farmington, CT (US)

( * ) Notice: Subject to any disclaimer, the term of this patent is extended or adjusted under 35 U.S.C. 154(b) by 250 days.

This patent is subject to a terminal disclaimer.

(21) Appl. No.: 17/408,607

(22) Filed: Aug. 23, 2021

(65) Prior Publication Data
US 2021/0381442 A1 Dec. 9, 2021

Related U.S. Application Data

(63) Continuation of application No. 16/291,392, filed on Mar. 4, 2019, now Pat. No. 11,125,167, which is a
(Continued)

(51) Int. Cl.
*F02C 7/36* (2006.01)
*F02C 7/06* (2006.01)
(Continued)

(52) U.S. Cl.
CPC .............. *F02C 7/36* (2013.01); *F01D 25/18* (2013.01); *F02C 3/107* (2013.01); *F02C 7/06* (2013.01);
(Continued)

(58) Field of Classification Search
CPC .... F02C 7/36; F02C 7/06; F02D 3/107; F05D 2220/323; F05D 2240/50; F05D 2240/12;
(Continued)

(56) References Cited

U.S. PATENT DOCUMENTS 2,258,792 A 10/1941 New
2,426,792 A 9/1947 Frank et al.
(Continued)

FOREIGN PATENT DOCUMENTS

EP 0791383 A1 8/1997
EP 1142850 A1 10/2001
(Continued)

OTHER PUBLICATIONS

Oates, G.C. (Ed). (1989). Aircraft propulsion systems and technology and design. Washington, D.C.: American Institute of Aeronautics, Inc. pp. 341-344.
(Continued)

*Primary Examiner* — Sabbir Hasan
*Assistant Examiner* — Joshua R Beebe
(74) *Attorney, Agent, or Firm* — Carlson, Gaskey & Olds, P.C.

(57) ABSTRACT

A fan drive gear system for a gas turbine engine includes a gear system that provides a speed reduction between a fan drive turbine and a fan and a mount flexibly supporting portions of the gear system. A lubrication system supporting the fan drive gear system provides lubricant to the gear system and removes thermal energy produced by the gear system. The lubrication system includes a capacity for removing thermal energy equal to less than about 2% of power input into the gear system.

19 Claims, 3 Drawing Sheets

Related U.S. Application Data continuation of application No. 14/190,159, filed on Feb. 26, 2014, now Pat. No. 10,221,770, which is a continuation of application No. PCT/US2013/041761, filed on May 20, 2013, which is a continuation of application No. 13/557,614, filed on Jul. 25, 2012, now Pat. No. 8,572,943.

(60) Provisional application No. 61/653,731, filed on May 31, 2012.

(51) Int. Cl.
  *F01D 25/18*   (2006.01)
  *F02K 3/06*    (2006.01)
  *F02C 3/107*   (2006.01)

(52) U.S. Cl.
  CPC ........ *F02K 3/06* (2013.01); *F05D 2260/4031* (2013.01); *Y02T 50/60* (2013.01)

(58) Field of Classification Search
  CPC ............. F05D 2200/14; F05D 2200/22; F05D 2200/13; F05D 2206/40311; F05D 2206/98; F05D 2206/70; F02K 3/06; F01D 15/18; F01D 7/00; F01D 17/162; Y02T 50/60

See application file for complete search history.

(56) References Cited

U.S. PATENT DOCUMENTS

| | | |
|---|---|---|
| 2,608,821 A | 9/1952 | Hunsaker |
| 2,748,623 A | 6/1956 | Hill |
| 2,826,255 A | 3/1958 | Peterson |
| 2,936,655 A | 5/1960 | Peterson et al. |
| 3,021,731 A | 2/1962 | Stoeckicht |
| 3,033,002 A | 5/1962 | William et al. |
| 3,111,005 A | 11/1963 | Howell et al. |
| 3,185,857 A | 5/1965 | Johnson |
| 3,194,487 A | 7/1965 | Tyler et al. |
| 3,287,906 A | 11/1966 | Mccormick |
| 3,352,178 A | 11/1967 | Lindgren et al. |
| 3,363,419 A | 1/1968 | Light et al. |
| 3,390,527 A | 7/1968 | Decher et al. |
| 3,412,560 A | 11/1968 | Gaubatz |
| 3,526,092 A | 9/1970 | Steel et al. |
| 3,664,612 A | 5/1972 | Skidmore et al. |
| 3,729,957 A | 5/1973 | Petrie et al. |
| 3,747,343 A | 7/1973 | Rosen |
| 3,754,484 A | 8/1973 | Roberts |
| 3,765,623 A | 10/1973 | Donelson et al. |
| 3,779,345 A | 12/1973 | Barnes et al. |
| 3,820,719 A | 6/1974 | Clark et al. |
| 3,843,277 A | 10/1974 | Ehrich |
| 3,861,139 A | 1/1975 | Jones |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,020,632 A | 5/1977 | Coffinberry et al. |
| 4,118,927 A | 10/1978 | Kronogard |
| 4,130,872 A | 12/1978 | Haloff |
| 4,136,286 A | 1/1979 | O'Halloran et al. |
| 4,220,171 A | 9/1980 | Ruehr et al. |
| 4,233,555 A | 11/1980 | Roche |
| 4,240,250 A | 12/1980 | Harris |
| 4,284,174 A | 8/1981 | Salvana et al. |
| 4,289,360 A | 9/1981 | Zirin |
| 4,358,969 A | 11/1982 | Silvestri |
| 4,405,892 A | 9/1983 | Staerzl |
| 4,423,333 A | 12/1983 | Rossman |
| 4,452,567 A | 6/1984 | Treby et al. |
| 4,463,553 A | 8/1984 | Boudigues |
| 4,478,551 A | 10/1984 | Honeycutt, Jr. et al. |
| 4,649,114 A | 3/1987 | Miltenburger et al. |
| 4,660,376 A | 4/1987 | Johnson |
| 4,696,156 A | 9/1987 | Burr et al. |
| 4,722,357 A | 2/1988 | Wynosky |
| 4,808,076 A | 2/1989 | Jarmon et al. |
| 4,809,498 A | 3/1989 | Giffin, III et al. |
| 4,827,712 A | 5/1989 | Coplin |
| 4,879,624 A | 11/1989 | Jones et al. |
| 4,887,424 A | 12/1989 | Geidel et al. |
| 4,979,362 A | 12/1990 | Vershure, Jr. |
| 5,046,306 A * | 9/1991 | Borre, Jr. ............... F16N 7/32 60/39.08 |
| 5,058,617 A | 10/1991 | Stockman et al. |
| 5,074,109 A | 12/1991 | Mandet et al. |
| 5,081,832 A | 1/1992 | Mowill |
| 5,102,379 A | 4/1992 | Pagluica et al. |
| 5,107,676 A | 4/1992 | Hadaway et al. |
| 5,141,400 A | 8/1992 | Murphy et al. |
| 5,160,251 A | 11/1992 | Ciokajlo |
| 5,168,208 A | 12/1992 | Schultz et al. |
| 5,182,464 A | 1/1993 | Woodworth et al. |
| 5,252,905 A | 10/1993 | Wills et al. |
| 5,307,622 A | 5/1994 | Ciokajlo et al. |
| 5,317,877 A | 6/1994 | Stuart |
| 5,361,580 A | 11/1994 | Ciokajlo et al. |
| 5,388,964 A | 2/1995 | Ciokajlo et al. |
| 5,390,068 A | 2/1995 | Schultz et al. |
| 5,433,674 A | 7/1995 | Sheridan et al. |
| 5,447,411 A | 9/1995 | Curley et al. |
| 5,466,198 A | 11/1995 | McKibbin et al. |
| 5,524,847 A | 6/1996 | Brodell et al. |
| 5,625,276 A | 4/1997 | Scott et al. |
| 5,634,767 A | 6/1997 | Dawson |
| 5,677,060 A | 10/1997 | Terentieva et al. |
| 5,694,027 A | 12/1997 | Satake et al. |
| 5,694,765 A | 12/1997 | Hield et al. |
| 5,720,694 A | 2/1998 | Jang |
| 5,723,016 A | 3/1998 | Minns et al. |
| 5,729,059 A | 3/1998 | Kilroy et al. |
| 5,734,255 A | 3/1998 | Thompson et al. |
| 5,740,668 A | 4/1998 | Fujiwara et al. |
| 5,754,033 A | 5/1998 | Thomson |
| 5,778,659 A | 7/1998 | Duesler et al. |
| 5,791,789 A | 8/1998 | Van Duyn et al. |
| 5,806,303 A | 9/1998 | Johnson |
| 5,809,843 A | 9/1998 | Barger et al. |
| 5,857,836 A | 1/1999 | Stickler et al. |
| 5,886,890 A | 3/1999 | Ishida et al. |
| 5,915,917 A | 6/1999 | Eveker et al. |
| 5,949,153 A | 9/1999 | Tison et al. |
| 5,975,841 A | 11/1999 | Lindemuth et al. |
| 5,985,470 A | 11/1999 | Spitsberg et al. |
| 6,073,439 A | 6/2000 | Beaven et al. |
| 6,104,171 A | 8/2000 | Dvorsky et al. |
| 6,196,790 B1 | 3/2001 | Sheridan et al. |
| 6,209,311 B1 | 4/2001 | Itoh et al. |
| 6,223,616 B1 | 5/2001 | Sheridan |
| 6,223,872 B1 | 5/2001 | Heller et al. |
| 6,260,351 B1 | 7/2001 | Delano et al. |
| 6,315,815 B1 | 11/2001 | Spadaccini et al. |
| 6,318,070 B1 | 11/2001 | Rey et al. |
| 6,330,525 B1 | 12/2001 | Hays et al. |
| 6,339,927 B1 | 1/2002 | DiPietro, Jr. |
| 6,354,413 B2 | 3/2002 | Heller et al. |
| 6,378,308 B1 | 4/2002 | Pfluger |
| 6,387,456 B1 | 5/2002 | Eaton, Jr. et al. |
| 6,517,341 B1 | 2/2003 | Brun et al. |
| 6,555,929 B1 | 4/2003 | Eaton et al. |
| 6,607,165 B1 | 8/2003 | Manteiga et al. |
| 6,619,030 B1 | 9/2003 | Seda et al. |
| 6,631,310 B1 | 10/2003 | Leslie |
| 6,639,331 B2 | 10/2003 | Schultz |
| 6,647,707 B2 | 11/2003 | Dev |
| 6,653,821 B2 | 11/2003 | Kern et al. |
| 6,657,416 B2 | 12/2003 | Kern et al. |
| 6,663,530 B2 | 12/2003 | Poulin et al. |
| 6,668,629 B1 | 12/2003 | Leslie |
| 6,669,393 B2 | 12/2003 | Schilling |
| 6,708,482 B2 | 3/2004 | Seda |

(56) References Cited

U.S. PATENT DOCUMENTS

| | | |
|---|---|---|
| 6,709,492 B1 | 3/2004 | Spadaccini et al. |
| 6,723,016 B2 | 4/2004 | Sumi |
| 6,732,502 B2 | 5/2004 | Seda et al. |
| 6,735,954 B2 | 5/2004 | MacFarlane et al. |
| 6,763,653 B2 | 7/2004 | Orlando et al. |
| 6,789,522 B2 | 9/2004 | Seymour |
| 6,792,759 B2 | 9/2004 | Rollins, III |
| 6,814,541 B2 | 11/2004 | Evans et al. |
| 6,847,297 B2 | 1/2005 | Lavoie et al. |
| 6,855,089 B2 | 2/2005 | Poulin et al. |
| 6,883,303 B1 | 4/2005 | Seda |
| 6,892,115 B2 | 5/2005 | Berkcan et al. |
| 6,895,741 B2 | 5/2005 | Rago et al. |
| 6,909,942 B2 | 6/2005 | Andarawis et al. |
| 6,914,763 B2 | 7/2005 | Reedy |
| 6,966,174 B2 | 11/2005 | Paul |
| 6,985,784 B2 | 1/2006 | Vandevanter et al. |
| 6,999,291 B2 | 2/2006 | Andarawis et al. |
| 7,019,495 B2 | 3/2006 | Patterson |
| 7,021,042 B2 | 4/2006 | Law |
| 7,043,340 B2 | 5/2006 | Papallo et al. |
| 7,055,306 B2 | 6/2006 | Jones et al. |
| 7,104,918 B2 | 9/2006 | Mitrovic |
| 7,144,349 B2 | 12/2006 | Mitrovic |
| 7,195,446 B2 | 3/2007 | Seda et al. |
| 7,216,475 B2 | 5/2007 | Johnson |
| 7,219,490 B2 | 5/2007 | Dev |
| 7,223,197 B2 | 5/2007 | Poulin et al. |
| 7,269,938 B2 | 9/2007 | Moniz et al. |
| 7,299,621 B2 | 11/2007 | Bart et al. |
| 7,301,738 B2 | 11/2007 | Pearlman et al. |
| 7,328,580 B2 | 2/2008 | Lee et al. |
| 7,334,392 B2 | 2/2008 | Moniz et al. |
| 7,334,395 B2 | 2/2008 | Tweedie et al. |
| 7,338,259 B2 | 3/2008 | Shah et al. |
| 7,374,403 B2 | 5/2008 | Decker et al. |
| 7,406,830 B2 | 8/2008 | Valentian et al. |
| 7,409,819 B2 | 8/2008 | Henry |
| 7,451,592 B2 | 11/2008 | Taylor et al. |
| 7,500,365 B2 | 3/2009 | Suciu et al. |
| 7,513,102 B2 | 4/2009 | Moniz et al. |
| 7,513,103 B2 | 4/2009 | Orlando et al. |
| 7,557,544 B2 | 7/2009 | Heinz et al. |
| 7,591,754 B2 | 9/2009 | Duong et al. |
| 7,594,388 B2 | 9/2009 | Cherry et al. |
| 7,594,404 B2 | 9/2009 | Somanath et al. |
| 7,600,370 B2 | 10/2009 | Dawson |
| 7,600,971 B2 | 10/2009 | Damgaard et al. |
| 7,610,763 B2 | 11/2009 | Somanath et al. |
| 7,632,064 B2 | 12/2009 | Somanath et al. |
| 7,656,060 B2 | 2/2010 | Algrain |
| 7,658,060 B2 | 2/2010 | Zysman et al. |
| 7,662,059 B2 | 2/2010 | McCune |
| 7,665,293 B2 | 2/2010 | Wilson, Jr. et al. |
| 7,685,808 B2 | 3/2010 | Orlando et al. |
| 7,694,505 B2 | 4/2010 | Schilling |
| 7,704,178 B2 | 4/2010 | Sheridan et al. |
| 7,716,914 B2 | 5/2010 | Schilling |
| 7,721,549 B2 | 5/2010 | Baran |
| 7,762,086 B2 | 7/2010 | Schwark |
| 7,765,786 B2 | 8/2010 | Klingels et al. |
| 7,765,788 B2 | 8/2010 | Schwarz |
| 7,797,946 B2 | 9/2010 | Kumar et al. |
| 7,806,651 B2 | 10/2010 | Kennepohl et al. |
| 7,815,417 B2 | 10/2010 | Somanath et al. |
| 7,816,813 B2 | 10/2010 | Yagudayev et al. |
| 7,824,305 B2 | 11/2010 | Duong et al. |
| 7,828,682 B2 | 11/2010 | Smook |
| 7,832,193 B2 | 11/2010 | Orlando et al. |
| 7,841,163 B2 | 11/2010 | Welch et al. |
| 7,841,165 B2 | 11/2010 | Orlando et al. |
| 7,871,247 B2 | 1/2011 | Shah et al. |
| 7,882,691 B2 | 2/2011 | Lemmers, Jr. et al. |
| 7,882,693 B2 | 2/2011 | Schilling |
| 7,926,260 B2 | 4/2011 | Sheridan et al. |
| 7,942,079 B2 | 5/2011 | Russ |
| 7,950,237 B2 | 5/2011 | Grabowski et al. |
| 7,959,532 B2 | 6/2011 | Suciu et al. |
| 7,970,556 B2 | 6/2011 | Hala et al. |
| 7,997,868 B1 | 8/2011 | Liang |
| 8,015,798 B2 | 9/2011 | Norris et al. |
| 8,015,828 B2 | 9/2011 | Moniz et al. |
| 8,061,969 B2 | 11/2011 | Durocher et al. |
| 8,075,261 B2 | 12/2011 | Merry et al. |
| 8,088,215 B2 | 1/2012 | Takahashi |
| 8,091,371 B2 | 1/2012 | Durocher et al. |
| 8,104,265 B2 | 1/2012 | Kupratis |
| 8,104,289 B2 | 1/2012 | McCune et al. |
| 8,106,633 B2 | 1/2012 | Dozier et al. |
| 8,166,748 B2 | 5/2012 | Schilling |
| 8,172,717 B2 | 5/2012 | Lopez et al. |
| 8,191,352 B2 | 6/2012 | Schilling |
| 8,205,432 B2 | 6/2012 | Sheridan |
| 8,220,245 B1 | 7/2012 | Papandreas |
| 8,246,503 B2 | 8/2012 | Sheridan et al. |
| 8,266,889 B2 | 9/2012 | Coffinberry |
| 8,297,916 B1 | 10/2012 | McCune et al. |
| 8,297,917 B1 | 10/2012 | McCune et al. |
| 8,366,385 B2 | 2/2013 | Davis et al. |
| 8,508,059 B2 | 8/2013 | Burton |
| 8,568,099 B2 | 10/2013 | Sabannavar et al. |
| 8,572,943 B1 | 11/2013 | Sheridan |
| 8,672,801 B2 | 3/2014 | McCune et al. |
| 8,684,303 B2 | 4/2014 | Suciu et al. |
| 8,756,908 B2 | 6/2014 | Sheridan et al. |
| 9,840,969 B2 | 12/2017 | Sheridan |
| 2001/0015308 A1 | 8/2001 | Heller et al. |
| 2003/0235523 A1 | 12/2003 | Lyubovsky et al. |
| 2005/0138914 A1 | 6/2005 | Paul |
| 2005/0257528 A1 | 11/2005 | Dunbar, Jr. |
| 2006/0029894 A1 | 2/2006 | Zinn et al. |
| 2006/0104818 A1 | 5/2006 | McMillan et al. |
| 2006/0130456 A1 | 6/2006 | Suciu et al. |
| 2006/0177302 A1 | 8/2006 | Berry |
| 2006/0179818 A1 | 8/2006 | Merchant |
| 2006/0228206 A1 | 10/2006 | Decker et al. |
| 2006/0244327 A1 | 11/2006 | Kundel |
| 2007/0036655 A1 | 2/2007 | Damgaard et al. |
| 2007/0125066 A1 | 6/2007 | Orlando et al. |
| 2007/0243068 A1 | 10/2007 | Wadia et al. |
| 2007/0262661 A1 | 11/2007 | Al |
| 2008/0003096 A1 | 1/2008 | Kohli et al. |
| 2008/0056888 A1 | 3/2008 | Somanath et al. |
| 2008/0056904 A1 | 3/2008 | Somanath et al. |
| 2008/0098713 A1 | 5/2008 | Orlando et al. |
| 2008/0098718 A1 | 5/2008 | Henry et al. |
| 2008/0110596 A1 | 5/2008 | Schwarz et al. |
| 2008/0116009 A1 | 5/2008 | Sheridan et al. |
| 2008/0116010 A1 | 5/2008 | Portlock et al. |
| 2008/0148708 A1 | 6/2008 | Chou et al. |
| 2008/0148881 A1 | 6/2008 | Moniz et al. |
| 2008/0149445 A1 | 6/2008 | Kern et al. |
| 2008/0184694 A1 | 8/2008 | Guimbard et al. |
| 2008/0276621 A1 | 11/2008 | Somanath et al. |
| 2008/0304974 A1 | 12/2008 | Marshall et al. |
| 2008/0317588 A1 | 12/2008 | Grabowski et al. |
| 2009/0007569 A1 | 1/2009 | Lemmers, Jr. et al. |
| 2009/0023058 A1 | 1/2009 | Kim |
| 2009/0053058 A1 | 2/2009 | Kohlenberg et al. |
| 2009/0056306 A1 | 3/2009 | Suciu et al. |
| 2009/0056343 A1 | 3/2009 | Suciu et al. |
| 2009/0097967 A1 | 4/2009 | Smith et al. |
| 2009/0188232 A1* | 7/2009 | Suciu .................... B64D 27/18 60/785 |
| 2009/0229242 A1 | 9/2009 | Schwark |
| 2009/0245997 A1 | 10/2009 | Hurwitz et al. |
| 2009/0265049 A1 | 10/2009 | Wise et al. |
| 2009/0293445 A1 | 12/2009 | Ress, Jr. |
| 2009/0304518 A1 | 12/2009 | Kodama et al. |
| 2009/0314881 A1 | 12/2009 | Suciu et al. |
| 2009/0317229 A1 | 12/2009 | Suciu et al. |
| 2009/0320488 A1 | 12/2009 | Gilson et al. |
| 2010/0005810 A1 | 1/2010 | Jarrell et al. |
| 2010/0007207 A1 | 1/2010 | Peuser |

(56) References Cited

U.S. PATENT DOCUMENTS

| | | | |
|---|---|---|---|
| 2010/0013239 A1 | 1/2010 | Damgaard et al. | |
| 2010/0080700 A1 | 4/2010 | Venter | |
| 2010/0105516 A1* | 4/2010 | Sheridan | F16H 1/227 475/346 |
| 2010/0126141 A1 | 5/2010 | Schilling | |
| 2010/0127117 A1 | 5/2010 | Combes et al. | |
| 2010/0132376 A1 | 6/2010 | Durocher et al. | |
| 2010/0132377 A1 | 6/2010 | Durocher et al. | |
| 2010/0135786 A1 | 6/2010 | Manteiga et al. | |
| 2010/0148396 A1 | 6/2010 | Xie et al. | |
| 2010/0154384 A1 | 6/2010 | Schilling | |
| 2010/0197444 A1 | 8/2010 | Montestruc | |
| 2010/0198534 A1 | 8/2010 | Hala et al. | |
| 2010/0212281 A1 | 8/2010 | Sheridan | |
| 2010/0218483 A1 | 9/2010 | Smith | |
| 2010/0219779 A1 | 9/2010 | Bradbrook | |
| 2010/0236216 A1 | 9/2010 | Winter et al. | |
| 2010/0296947 A1* | 11/2010 | DiBenedetto | F01D 25/20 417/381 |
| 2010/0301617 A1 | 12/2010 | Lundbladh | |
| 2010/0317477 A1 | 12/2010 | Sheridan et al. | |
| 2010/0326050 A1 | 12/2010 | Schilling et al. | |
| 2010/0331139 A1 | 12/2010 | McCune | |
| 2011/0056208 A1 | 3/2011 | Norris et al. | |
| 2011/0106510 A1 | 5/2011 | Poon | |
| 2011/0116510 A1 | 5/2011 | Breslin et al. | |
| 2011/0130246 A1 | 6/2011 | McCune et al. | |
| 2011/0149624 A1 | 6/2011 | Yamanaka | |
| 2011/0159797 A1 | 6/2011 | Beltman et al. | |
| 2011/0293423 A1 | 12/2011 | Bunker et al. | |
| 2012/0007431 A1 | 1/2012 | Jang et al. | |
| 2012/0017603 A1 | 1/2012 | Bart et al. | |
| 2012/0124964 A1 | 5/2012 | Hasel et al. | |
| 2012/0174593 A1 | 7/2012 | Sharma et al. | |
| 2012/0198816 A1 | 8/2012 | Suciu et al. | |
| 2012/0275904 A1 | 11/2012 | McCune et al. | |
| 2013/0001547 A1 | 1/2013 | Girard et al. | |
| 2013/0115476 A1 | 5/2013 | Castle et al. | |
| 2013/0116937 A1 | 5/2013 | Calhoun et al. | |
| 2013/0178327 A1 | 7/2013 | Sheridan et al. | |
| 2013/0192200 A1 | 8/2013 | Kupratis et al. | |
| 2013/0192266 A1 | 8/2013 | Houston et al. | |
| 2013/0287575 A1 | 10/2013 | McCune et al. | |
| 2014/0020404 A1 | 1/2014 | Sheridan et al. | |
| 2014/0154054 A1 | 6/2014 | Sheridan et al. | |
| 2014/0178180 A1 | 6/2014 | Sheridan | |
| 2015/0096303 A1 | 4/2015 | Schwarz et al. | |
| 2015/0308351 A1 | 10/2015 | Sheridan | |

FOREIGN PATENT DOCUMENTS

| | | |
|---|---|---|
| EP | 1429005 A2 | 6/2004 |
| EP | 1777391 A2 | 4/2007 |
| EP | 2327859 A2 | 6/2011 |
| EP | 2339146 A1 | 6/2011 |
| EP | 2532841 A2 | 12/2012 |
| EP | 2532858 A2 | 12/2012 |
| EP | 2597292 A2 | 5/2013 |
| GB | 1309721 A | 3/1973 |
| GB | 1516041 A | 6/1978 |
| GB | 2041090 A | 9/1980 |
| GB | 2130340 A | 5/1984 |
| GB | 2199375 A | 7/1988 |
| GB | 2204642 A | 11/1988 |
| GB | 2419639 A | 5/2006 |
| GB | 2426792 A | 12/2006 |
| GB | 2419639 B | 9/2009 |
| JP | 2007139160 A | 6/2007 |
| JP | 2008038902 A | 2/2008 |
| RU | 2346176 C1 | 2/2009 |
| RU | 2347928 C1 | 2/2009 |
| RU | 2358375 C2 | 6/2009 |
| SU | 198845 A1 | 6/1967 |
| WO | 2007038674 A1 | 4/2007 |
| WO | 2013116262 A1 | 8/2013 |
| WO | 2014028085 A2 | 2/2014 |
| WO | 2014047040 A1 | 3/2014 |

OTHER PUBLICATIONS

Parker, R.G. and Lin, J. (2001). Modeling, modal properties, and mesh stiffness variation instabilities of planetary gears. Prepared for NASA. NASA/CR-2001-210939. May 2001. pp. 1-111.

Petition for Inter Partes Review of U.S. Pat. No. 8,297,916, *General Electric Company*, Petitioner, v. *United Technologies Corporation*, Patent Owner, IPR2018-01171, May 30, 2018.

Petition for Inter Partes Review of U.S. Pat. No. 8,297,916, *General Electric Company*, Petitioner v, *United Technologies Corporation*, Patent Owner: IPR2018-01172, filed May 30, 2018, 83 pages.

Petition for Inter Partes Review of U.S. Pat. No. 8,572,943, *General Electric Company*, Petitioner, v. *United Technologies Corporation*, Patent Owner IPR2017-01096, Filed Mar. 16, 2017.

Petition for Inter Partes Review of U.S. Pat. No. 8,572,943, *General Electric Company*, Petitioner, v. *United Technologies Corporation*, Patent Owner, IPR2017-01097, Filed Mar. 16, 2017.

Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.

Power Technology, "GE's H-Series Breaks 60% Fuel Efficiency Barrier", retrieved from internet https://www.power-technology.com/features/feature1084/, 2007, 8 pages.

Press release. The GE90 engine. Retrieved from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.

Princeton, "Composite Materials", https://www.princeton.edu/-humcomp/bikes/design/desi_30.htm, on Oct. 9, 2019, 1 page.

Product Brochure. Garrett TFE731. Allied Signal. Copyright 1987. pp. 1-24.

Pyrograf-III Carbon Nanofiber. Product guide. Retrieved Dec. 1, 2015 from: http://pyrografproducts.com/Merchant5/merchant.mvc?Screen=cp_nanofiber.

Ramsden, J.M. (Ed). (1978). The new European airliner. Flight International, 113(3590). Jan. 7, 1978. pp. 39-43.

Ratna, D. (2009). Handbook of thermoset resins. Shawbury, UK: iSmithers. pp. 187-216.

Rauch, D. (1972). Design study of an air pump and integral lift engine ALF-504 using the Lycoming 502 core. Prepare for NASA. Jul. 1972. pp. 1-182.

Read, B. (2014). Powerplant revolution. AeroSpace. May 2014. pp. 28-31.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

Reynolds, C.N., "Advanced prop-fan engine technology (APET) single- and counter-rotation gearbox/pitch change mechanism," Prepared for NASA, NASA CR-168114 (vol. II), Jul. 1985, pp. 1-175.

Riegler, C., and Bichlmaier, C. (2007). The geared turbofan technology—Opportunities, challenges and readiness status. Porceedings CEAS. Sep. 10-13, 2007. Berlin, Germany. pp. 1-12.

Rolls-Royce M45H. Jane's Aero-engines, Aero-engines—Turbofan. Feb. 24, 2010.

Roux, E. (2007). Turbofan and turbojet engines database handbook. Editions Elodie Roux. Blagnac: France. pp. 1-595.

Roux E., "Turbofan and turbojet engines database handbook", Editions Elodie Roux. Blagnac: France, 2007, pp. 41-42, pp. 465, pp. 468-469.

(56) References Cited

OTHER PUBLICATIONS

Salemme, C.T. and Murphy, G.C. (1979). Metal spar/superhybrid shell composite fan blades. Prepared for NASA. NASA-CR-1-59594. Aug. 1979. pp. 1-127.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.
Seader, J.D. and Henley, E.J. (1998). Separation process principles. New York, NY: John Wiley & Sons, Inc. pp. 722-726 and 764-771.
Sessions R., "Turbo Hydra-Malic 350 Handbook", 1985, The Berkley Publishing Group, pp. 24-25.
Shah, D.M. (1992). MoSi2 and other silicides as high temperature structural materials. Superalloys 1992. The Minerals, Metals, & Materials Society. pp. 409-422.
Shlakhtenko S.M., "Theory and calculations of the air jet engines", 1987, pp. 350-357.
Shorter Oxford English Dictionary, 6th Edition. (2007), vol. 2, N-Z, pp. 1888.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Singapore Search Report and Written Opinion for Application No. SG10201403358X, dated May 29, 2015, 16 pages.
Singapore Search Report and Written Opinion for Application No. SG10201705204X dated Feb. 22, 2019.
Singh, A. (2005). Application of a system level model to study the planetary load sharing behavior. Jounal of Mechanical Design. vol. 127. May 2005. pp. 469-476.
Singh, B. (1986). Small engine component technology (SECT) study. NASA CR-175079. Mar. 1, 1986. pp. 1-102.
Smith-Boyd, L. and Pike, J. (1986). Expansion of epicyclic gear dynamic analysis program. Prepared for NASA. NASA CR-179563. Aug. 1986. pp. 1-98.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. For Gas Turbine and Power, vol. 123. Oct. 2001. pp 741-746.
Summons to Attend Oral Proceedings for European Application No. EP17175088.8 dated Nov. 22, 2019.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Sutliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Sweetman, B. and Sutton, O. (1998). Pratt & Whitney's surprise leap. Interavia Business & Technology, 53.621, p. 25.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Team CCJ. Turbine blade, vane cooling—a primer. Retrieved Oct. 9, 2019 from: https://www.ccj-online.com/turbine-blade-vane-cooling-a-primer/.
Technical Data. Teflon. WS Hampshire Inc. Retrieved from: http://catalog.wshampshire.com/Asset/psg_teflon_ptfe.pdf.
Groweneweg, J.F. (1994). Fan noise research at NASA. Noise-CON 94. Fort Lauderdale, FL. May 1-4, 1994. pp. 1-10.
Guha, "Optimum Fan Pressure Ratio for Bypass Engines with Separate or Mixed Exhaust Streams", Journal of Propulsion and Power, vol. 17, No. 5. Sep.-Oct. 2001, pp. 1117-1122, [retrieved on Aug. 21, 2013]. Retrieved from the Internet: http://www.facweb.iitkgp,ernet.in/.about.aguha/research/AIAA2001- .pdfentire document.
Gunston, B. (Ed.) (2000). Jane's aero-engines, Issue seven. Coulsdon, Surrey, UK: Jane's Information Group Limited. pp. 510-512.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Haldenbrand, R. and Norgren, W.M. (1979). Airesearch QCGAT program [quiet clean general aviation turbofan engines]. NASA-CR-159758. pp. 1-199.
Hall, C.A. and Crichton, D. (2007). Engine design studies for a silent aircraft. Journal of Turbomachinery, 129, 479-487.
Han, J., Dutta, S., and Ekkad, S.V. (2000). Gas turbine heat transfer and cooling technology. New York, NY: Taylor & Francis. pp. 1-25, 129-157, and 160-249.
Handschuh R.F., et al., "Operational Influence on Thermal Behavior of High-Speed Helical Gear Trains," Prepared for Forum 62, NASA/TM-2006-214344, ARL-TR-3969, May 9-11, 2006, 18 pages.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Hazlett, R.N. (1991). Thermal oxidation stability of aviation turbine fuels. Philadelphia, PA: ASTM. pp. 1-163.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Hemighaus, G., Boval, T., Bacha, J., Barnes, F., Franklin, M., Gibbs, L., ... Morris, J. (2007). Aviation fuels: Techincal review. Chevron Products Company. pp. 1-94. Retrieved from: https://www.cgabusinessdesk.com/document/aviation_tech_review.pdf.
Hendricks, E.S. and Tong, M.T. (2012). Performance and weight estimates for an advanced open rotor engine. NASA/TM-2012-217710. pp 1-13.
Hess, C. (1998). Pratt & Whitney develops geared turbofan. Flug Revue 43(7). Oct. 1998.
Hicks R.J., et al., "Optimised Gearbox Design for Modern Wind Turbines," Orbital2 Ltd, Wales, UK, Nov. 20, 2014, pp. 1-8.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Holcombe, V. (2003). Aero-Propulsion Technology (APT) task V low noise ADP engine definition study. NASA CR-2003-212521. Oct. 1, 2003. pp. 1-73.
Honeywell Learjet 31 and 35/36 TFE731-2 to 2C Engine Upgrade Program. Sep. 2005. pp. 1-4.
Honeywell LF502. Jane's Aero-engines, Aero-engines—Turbofan. Feb. 9, 2012.

(56) References Cited

OTHER PUBLICATIONS

Honeywell LF502. Jane's Aero-engines, Aero-engines—Turbofan. Aug. 17, 2016.
Honeywell LF507. Jane's Aero-engines, Aero-engines—Turbofan. Feb. 9, 2012.
Honeywell Sabreliner 65 TFE731-3 to—3D Engine Upgrade Program. Oct. 2005. pp. 1-4.
Honeywell TFE731. Jane's Aero-engines, Aero-engines—Turbofan. Jul. 18, 2012.
Honeywell TFE731 Pilot Tips. pp. 1-143.
Honeywell TFE731-5AR to—5BR Engine Conversion Program. Sep. 2005. pp. 1-4.
Horikoshi, S. and Serpone, N. (2013). Introduction to nanoparticles. Microwaves in nanoparticle synthesis. Wiley-VCH Verlag GmbH & Co. KGaA. pp. 1-24.
Howe, D.C. and Wynosky, T.A. (1985). Energy efficient engine program advanced turbofan nacelle definition study. NASA CR-174942. May 1, 1985. pp. 174.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Hughes, C. (2010). Geared turbofan technology. NASA Environmentally Responsible Aviation Project. Green Aviation Summit. NASA Ames Research Center. Sep. 8-9, 2010. pp. 1-8.
International Preliminary Report on Patentability for PCT Application No. PCT/US2013/041761, dated Dec. 11, 2014, 8 pages.
International Search Report and Written Opinion for PCT Application No. PCT/US2013/041761, dated Mar. 21, 2014, 17 pages.
Vanov M.N., "Machine Components", 1976, pp. 199-200 and 276-279.
Ivchenko-Progress AI-727M. Jane's Aero-engines, Aero-engines—Turbofan. Nov. 27, 2011.
Ivchenko-Progress D-436. Jane's Aero-engines, Aero-engines—Turbofan. Feb. 8, 2012.
Ivchenko-Progress D-727. Jane's Aero-engines, Aero-engines—Turbofan. Feb. 7, 2007.
Jacobson, N.S. (1993). Corrosion of silicon-based ceramics in combustion environments. J. Am. Ceram. Soc. 76(1). pp. 3-28.
Jeng, Y.-L., Lavernia, E.J. (1994). Processing of molybdenum disilicide. J. of Mat. Sci. vol. 29. 1994. pp. 2557-2571.
Johnston, R.P. and Hemsworth, M.C. (1978). Energy efficient engine preliminary design and integration studies. Jun. 1, 1978. pp. 1-28.
Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.
Jorgensen, P.J., Wadsworth, M.E., and Cutler, I.B. (1961). Effects of water vapor on oxidation of silicon carbide. J. Am. Ceram. Soc. 44(6). pp. 248-261.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Kandebo, S.W. (1998). Geared-Turbofan engine design targets cost, complexity. Aviation Week & Space Technology, 148(8). p. 34-5.
Kandebo, S.W. (1998). Pratt & Whitney launches geared turbofan engine. Aviation Week & Space Technology, 148(8). p. 32-4.
Declaration of Dr. Magdy Attia, In re U.S. Pat. No. 8,517,668, Executed Dec. 8, 2016, pp. 1-81.
Declaration of John Eaton, Ph.D. In re U.S. Pat. No. 8,869,568, Executed Mar. 28, 2016, pp. 1-87.
Declaration of Magdy Attia, In re U.S. Pat. No. 8,572,943, IPR2017-01096, Executed Mar. 8, 2017, pp. 1-48.
Declaration of Magdy Attia, In re U.S. Pat. No. 8,572,943, IPR2017-01097, Executed Mar. 8, 2017, pp. 1-48.
Declaration of Raymond Drago., In re U.S. Pat. No. 8,297,916, IPR2018-01172, Executed May 29, 2018, pp. 1-115.
Declaration of Raymond Drago, In re U.S. Pat. No. 8,572,943, IPR2017-01096, Executed Mar. 7, 2017, pp. 1-48.
Declaration of Raymond Drago, In re U.S. Pat. No. 8,572,943, IPR2017-01097, Executed Mar. 7, 2017, pp. 1-48.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Diagram of Prior Art V2500 and PW4090 Engines, 1 page.
Dickey, T.A. and Dobak, E.R. (1972). The evolution and development status of ALF 502 turbofan engine. National Aerospace Engineering and Manufacturing Meeting San Diego, California. Oct. 2-5, 1972. pp. 1-12.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-318 and 12.7-12.21.
Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-3122.
El-Sayad, A.F. (2008). Aircraft propulsion and gas turbine engines. Boca Raton, FL: CRC Press. pp. 215-219 and 855-860.
English Translation of Measurement and Calculation Methodology on TFE/31-2, TFE731-3A and TFE731-3D Models, 14 pages.
EP Office Action for Application No. EP16159312.4, dated Oct. 16, 2018, 10 pages.
EP Office Action for Application No. EP16174051.9, dated Oct. 15, 2018, 28 pages.
EP Office Action for Application No. EP17199484.1, dated Jan. 2, 2019, 5 pages.
European Search Report for Application No. EP13829380.8 dated Oct. 29, 2014.
European Search Report for Application No. EP14185717.7, dated Jan. 22, 2015, 7 pages.
European Search Report for Application No. EP16175828.9, dated Nov. 8, 2016, 8 pages.
European Search Report for Application No. EP17175088.8, dated Aug. 29, 2017, 13 pages.
European Search Report for Application No. EP20173980.2 dated Nov. 16, 2020.
Faghri, A. (1995). Heat pipe and science technology. Washington, D.C.: Taylor & Francis. pp. 1-60.
Falchetti, F., Quiniou, H., and Verdier, L. (1994). Aerodynamic design and 3D Navier-Stokes analysis of a high specific flow fan.

(56) References Cited

OTHER PUBLICATIONS

ASME. Presented at the International Gas Turbine and Aeroengine Congress and Exposition. The Hague, Netherlands. Jun. 13-16, 1994. pp. 1-10.
File History for U.S. Appl. No. 12/131,876.
Final Written Decision U.S. Pat. No. 8,572,943, *General Electric Company*, Petitioner, v. *United Technologies Corporation*, Patent Owner, IPR2017-01097, Entered Sep. 11, 2018.
Final Written Decision U.S. Pat. No. 8,572,943, *General Electric Company*, Petitioner, v. *United Technologies Corporation*, Patent Owner, IPR2017-01096, Entered Sep. 11, 2018.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Frankenfeld, J.W. and Taylor, W.F. (1980). Deposit fromation from deoxygenated hydrocarbons. 4. Studies in pure compound systems Ind. Eng. Chem., Prod. Res. Dev., vol. 19(1). 1978. pp. 65-70.
Garret TFE731 Turbofan Engine (Cat C). Chapter 79: Lubrciation System. TTFE731 Issue 2. 2010. pp. 1-24.
Gates, D. Bombardier flies at higher market. Seattle Times. Jul. 13, 2008. pp. C6.
GE Reports (2009). GE's breakthrough GEnx debuts at the Paris Air Show. Retrieved Jun. 6, 2009 from: http://www.gereports.com/ges-breakthrough-genx-debuts-at-the-paris-air-show/.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Gliebe, P.R., Ho, P.Y., and Mani, R. (1995). UHB engine fan and broadband noise reduction study. NASA CR-198357. Jun. 1995. pp. 1-48.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
Griffiths, B. (2005). Composite fan blade containment case. Modern Machine Shop. Retrieved from: http://www.mmsonline.com/articles/composite-fan-blade-containment-case pp. 1-4.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Mattingly J.D., "Aircraft Engine Design", Second Edition, American Institute of Aeronautics and Astronautics, Inc., 2002, pp. 96 and 292.
Notice of Opposition for European Patent No. 2949882 (15175205.2) dated May 23, 2018 by Safran Aircraft Engines.
Notice of Opposition to Patent No. EP2811120 (14155460.0) by Safran Aircraft Engines dated Apr. 12, 2018. [with English translation].
Patent Owner United Technologies Corporation's Preliminary Response in U.S. Pat. No. 8,572,943, *General Electric Company*, Petitioner, v. *United Technologies Corporation*, Patent Owner: IPR2017-01096, Filed Jul. 5, 2017, pp. 1-65.
Patent Owner United Technologies Corporation's Preliminary Response in U.S. Pat. No. 8,572,943, *General Electric Company*, Petitioner, v. *United Technologies Corporation*, Patent Owner: IPR2017-01097, Filed Jul. 5, 2017, pp. 1-65.
Request for Opinion filed for European Patent No. EP2532841B1 by Rolls Royce granted Apr. 27, 2016, dated Nov. 7, 2018.
Request for Opinion filed for European Patent No. EP2532858B1 by Rolls Royce granted Oct. 19, 2016, dated Nov. 7, 2018.
Request for Opinion filed for European Patent No. EP2737180B1 by Rolls Royce granted Apr. 13, 2016, dated Jul. 11, 2018.
Response to Observations by Patantee filed for European Patent No. EP2532841B1 by Rolls Royce granted Apr. 27, 2016, dated Jan. 18, 2019.
Response to Observations by Patantee filed for European Patent No. EP2532858B1 by Rolls Royce granted Oct. 19, 2016, dated Jan. 18, 2019.
Third Party Observations for EP Application No. EP13829380.8 dated Mar. 17, 2015.
Walsh, P. (2004). Gas turbine performance: 5.11.6 Radial flow turbines versus axial flow turbines. John Wiley and Sons. Blackwell Science, Second Edition. p. 214.
Youtube Video, "Pure Power PW1000G Engine: Customer Testimonials", published Jul. 26, 2010 (-seconds 43-63) available at https:www.youtube.com/watch?v=vgQgEftEd8c on Aug. 9, 2018.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp 1-10.
Kasuba, R. and August, R. (1984). Gear mesh sliffiless and load sharing in planetary gearing. American Society of Mechanical Engineers, Design Engineering Technical Conference, Cambridge, MA. Oct. 7-10, 1984. pp. 1-6.
Kerrebrock, J.L. (1977). Aircraft engines and gas turbines. Cambridge, MA: The MIT Press. p. 11.
Kjelgaard, C. (2010). Gear up for the GTF. Aircraft Technology, 105. Apr.-May 2010. pp. 86, 88, 90, 92-95.
Knip, Jr., G. (1987). Analysis of an advanced technology subsonic turbofan incorporating revolutionary materials. NASA Technical Memorandum. May 1987. pp. 1-23.
Kojima, Y. Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Krantz, T.L. (1990). Experimental and analytical evaluation of efficiency of helicopter planetary stage. NASA Technical Paper. Nov. 1990. pp. 1-19.
Krenkel, W., Naslain, R., and Schneider, H. Eds. (2001). High temperature ceramic matrix composites pp. 224-229. Weinheim, DE: Wiley-VCH Verlag GmbH.
Kurzke, J. (2001). GasTurb 9: A program to calculate design and off-design performance of gas turbines. Retrieved from: https://www.scribd.com/document/92384867/GasTurb9Manual.
Kurzke, J. (2012). GasTurb 12: Design and off-design performance of gas turbines. Retrieved from: https://www.scribd.com/document/153900429/GasTurb-12.
Kurzke, J. (2008). Preliminary Design, Aero-engine design: From state of the art turbofans towards innovative architectures. pp. 1-72.
Kurzke, J. (2009). Fundamental differences between conventional and geared turbofans. Proceedings of ASME Turbo Expo: Power for Land, Sea, and Air. 2009, Orlando, Florida. pp. 145-153.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Lau, K., Gu, C., and Hui, D. (2005). A critical review on nanotube and nanotube/nanoclay related polymer composite materials. Composites: Part B 37(2006) 425-436.
Leckie, F.A. and Dal Bello, D.J. (2009). Strength and stiffness of engineering systems. Mechanical Engineering Series. Springer. pp. 1-10, 48-51.
Leckie F.A., et al., "Strength and Stiffness of Engineering Systems," Mechanical Engineering Series, Springer, 2009, pp. 1-3.
Lee, K.N. (2000). Current status of environmental barrier coatings for Si-Based ceramics. Surface and Coatings Technology 133-134, 2000. pp. 1-7.
Levintan, R.M. (1975). Q-Fan demonstrator engine. Journal of Aircraft. vol. 12( 8). Aug. 1975. pp. 658-663.
Lewicki, D.G., Black, J.D., Savage, M., and Coy, J.J. (1985). Fatigue life analysis of a turboprop reduction gearbox. NASA

(56) References Cited

OTHER PUBLICATIONS

Technical Memorandum. Prepared for the Design Technical Conference (ASME). Sep. 11-13, 1985. pp. 1-26.
Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.
Lord, W.K., Macmartin, D.G., and Tillman, T.G. (2000). Flow control opportunities in gas turbine engines. American Institute of Aeronautics and Astronautics. pp. 1-15.
Lynwander, P. (1983). Gear drive systems: Design and application. New York, New York: Marcel Dekker, Inc. pp. 145, 355-358.
Macisaac, B. and Langston, R. (2011). Gas turbine propulsion systems. Chichester, West Sussex: John Wiley & Sons, Ltd. pp. 260-265.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Manual. Student's Guide to Learning SolidWorks Software. Dassault Systemes—SolidWorks Corporation. pp. 1-156.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.
Mattingly, J.D. (1996). Elements of gas turbine propulsion. New York, New York: McGraw-Hill, Inc. pp. 8-15.
Mattingly J.D., "Aircraft Engine Design," American Institute of Aeronautics and Astronautics Inc, 2nd Edition, Jan. 2002, pp. 292-322.
Mcardle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mccune, M.E. (1993). Initial test results of 40,000 horsepower fan drive gear system for advanced ducted propulsion systems. AIAA29th Joint Conference and Exhibit. Jun. 28-30, 1993. pp. 1-10.
Mcmillian, A. (2008) Material development for fan blade containment casing. Abstract, p. 1. Conference on Engineering and Physics: Synergy for Success 2006. Journal of Physics: Conference Series vol. 105. London, UK. Oct. 5, 2006.
Meier N., "Civil Turbojet/Turbofan Specifications", 2005, retrieved from http://jet-engine.net/civtfspec.html, 8 pages.
Merriam-Webster's collegiate dictionary, 10th Ed. (2001). p. 1125-1126.
Merriam-Webster's collegiate dictionary, 11th Ed. (2009). p. 824.
Meyer, A.G. (1988). Transmission development of TEXTRON Lycoming's geared fan engine. Technical Paper. Oct. 1988. pp. 1-12.
Middleton, P. (1971). 614: VFW's jet feederliner. Flight International, Nov. 4, 1971. p. 725, 729-732.
Moxon, J. How to save fuel in tomorrow's engines. Flight International. Jul. 30, 1983. 3873(124). pp. 272-273.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Munt, R. (1981). Aircraft technology assessment: Progress in low emissions engine. Technical Report. May 1981. pp. 1-171.
Nagendra S., et al., "Optimal rapid multidisciplinary response networks: RAPIDDISK," Structural and Multidisciplinary Optimization, Springer, Berlin, DE, vol. 29, No. 3, Mar. 1, 2005, pp. 213-231.
Nanocor Technical Data for Epoxy Nanocomposites using Nanomer 1.30E Nanoclay. Nnacor, Inc. Oct. 2004.
NASA Conference Publication. (1978). CTOL transport technology. NASA-CP-2036-PT-1. Jun. 1, 1978. pp. 1-531.
NASA Conference Publication. Quiet, powered-lift propulsion. Cleveland, Ohio. Nov. 14-15, 1978. pp. 1-420.
Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. March 1, 2986. pp. 1-101.
Norton, M. and Karczub, D. (2003). Fundamentals of noise and vibration analysis for engineers. Press Syndicate of the University of Cambridge. New York: New York. p. 524.
Notice of Opposition of European Patent No. 2811120 (14155460.0), dated Apr. 12, 2018 by Rolls-Royce, 74 pages.
Response to Observations by Patantee filed for European Patent No. EP2737180B1 by Rolls Royce granted Apr. 13, 2016, dated Jul. 18, 2018.
(2012). Gas Power Cycle—Jet Propulsion Technology, A case study. Machine Design Magazine. Nov. 5, 1998. Retrieved from: http://machinedesign.com/content/pw8000-0820.
About GasTurb. Retrieved Jun. 26, 2018 from: http://gasturb.de/about-gasturb.html.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
Aerospace Information Report. (2008). Advanced ducted propulsor in-flight thrust determination. SAE International AIR5450. Aug. 2008. p. 1-392.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
AGMA Information Sheet, "Double Helical Epicyclic Gear Units," ANSI-AGMA 940-A09, Approved Jan. 6, 2009, pp. 1-22.
AGMA Standard (1997). Design and selection of components for enclosed gear drives. lexandria, VA: American Gear Manufacturers Association. pp. 1-48.
AGMA Standard (1999). Flexible couplings—Mass elastic properties and other characteristics. Alexandria, VA: American Gear Manufacturers Association. pp. 1-46.
AGMA Standard (2006). Design manual for enclosed epicyclic gear drives. Alexandria, VA: American Gear Manufacturers Association. pp. 1-104.
Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.
Anderson N.E., et al., "An Analytical Method to Predict Efficiency of Aircraft Gearboxes," ASME J. Mech., Trans., and Automation, Sep. 1, 1986, vol. 108, pp. 424-432.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Avco Lycoming Divison. ALF 502L Maintenance Manual. Apr. 1981. pp. 1-118.

(56) References Cited

OTHER PUBLICATIONS

Aviadvigatel D-110. Jane's Aero-engines, Aero-engines—Turbofan. Jun. 1, 2010.

Awker, R.W. (1986). Evaluation of propfan propulsion applied to general aviation. NASA CR-175020. Mar. 1, 1986. pp. 1-140.

Baker, R.W. (2000). Membrane technology and applications. New York, NY: McGraw-Hill. pp. 87-153.

Baskharone E.A., "Principles of Turbomachinery in Air-Breathing Engines," Cambridge University Press, 2006, pp. 261-263.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Bornstein, N. (1993). Oxidation of advanced intermetallic compounds. Journal de Physique IV, 1993, 03 (C9), pp. C9-367-C9-373.

Brennan, P.J. and Kroliczek, E.J. (1979). Heat pipe design handbook. Prepared for National Aeronautics and Space Administration by B & K Engineering, Inc. Jun. 1979. pp. 1-348.

Brines, G.L. (1990). The turbofan of tomorrow. Mechanical Engineering: The Journal of the American Society of Mechanical Engineers, 108(8), 65-67.

Bucknell, R.L. (1973). Influence of fuels and lubricants on turbine engine design and performance, fuel and lubircant analyses. Final Technical Report, Mar. 1971-Mar. 1973. pp. 1-252.

Bunker, R.S. (2005). A review of shaped hole turbine film-cooling technology. Journal of Heat Transfer vol. 127. Apr. 2005. pp. 441-453.

Carney, K., Pereira, M. Revilock, and Matheny, P. (2003). Jet engine fan blade containment using two alternate geometries. 4th European LS-DYNA Users Conference. pp. 1-10.

Cheryan, M. (1998). Ultrafiltration and microfiltration handbook. Lancaster, PA: Tecnomic Publishing Company, Inc. pp. 171-236.

Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.

Clarke, D.R. and Levi, C.G. (2003). Materials design for the next generation thermal barrier coatings. Annual. Rev. Mater. Res. vol. 33. 2003. pp. 383-417.

Coy, Peter. The little gear that could reshape the jet engine: A simple idea's almost 30-year, $10 billion journey to the aircraft mainstream. Bloomberg Business. Oct. 15, 2015. p. 1-4.

Cramoisi, G. Ed. (2012). Death in the Potomac: The crash of Air Florida Flight 90. Air Crash Investigations. Accident Report NTSB/AAR-82-8. p. 45-47.

Cusick, M. (1981). Avco Lycoming's ALF 502 high bypass fan engine. Society of Automotive Engineers, Inc. Business Aircraft Meeting & Exposition. Wichita, Kansas. Apr. 7-10, 1981. pp. 1-9.

Daggett, D.L., Brown, S.T., and Kawai, R.T. (2003). Ultra-efficient engine diameter study. NASA/CR-2003-212309. May 2003. pp. 1-52.

Daly, M. Ed. (2008). Jane's Aero-Engine. Issue Twenty-three. Mar. 2008. p. 707-712.

Daly, M. Ed. (2010). Jane's Aero-Engine. Issue Twenty-seven. Mar. 2010. p. 633-636.

Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_sliffness_of_gears.

Darrah, S. (1987). Jet fuel deoxygenation. Interim Report for Period Mar. 1987-Jul. 1988. pp. 1-22.

Dassault Falcon 900EX Easy Systems Summary. Retrieved from: http://www.smartcockpit.com/docs/F900EX-Engines.pdf pp. 1-31.

Datasheet. CF6-80C2 high-bypass turbofan engines. Retrieved from https://geaviation.com/sites/default/files/datasheet-CF6-80C2.pdf.

Datasheet. CFM56-5B For the Airbus A320ceo family and CFM56-7B for the Boeing 737 family. https://www.cfmaeroengines.com/.

Datasheet. Genx™ high bypass turbofan engines. Retrieved from: https://www.geaviation.com/sites/default/files/datasheet-genx.pdf.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Davis, D.G.M. (1973). Variable-pitch fans: Progress in Britain. Flight International. Apr. 19, 1973. pp. 615-617.

De La Rosa Blanco, E., et al., "Challenges in the Silent Aircraft Engine Design", American Institute of Aeronautics and Astronautics, AIAA 2007-454, Jan. 8-11, 2007, 20 pages.

De la Rosa Blanco, E., Hall, C.A., and Crichton, D. (2007). Challenges in the Silent Aircraft Engine Design. 45th AIAA Aerospace Sciences Meeting and Exhibit. Jan. 8, 2007. pp. 1-20.

Decision Institution of Inter Partes Review of U.S. Pat. No. 8,572,943, *General Electric Company*, Petitioner v. *United Technologies Corporation*, Patent Owner. IPR2017-01096, Entered Oct. 2, 2017, pp. 1-26.

Decision Institution of Inter Partes Review of U.S. Pat. No. 8,572,943, *General Electric Company*, Petitioner, v. *United Technologies Corporation*, Patent Owner. IPR2017-01097, Entered Oct. 3, 2017, pp. 1-26.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Declaration of Courtney H. Bailey, In re U.S. Pat. No. 8,511,605, Executed Jul. 19, 2016, pp. 1-4.

Declaration of Dr. Magdy Attia, In re U.S. Pat. No. 8,313,280, Executed Oct. 21, 2016, pp. 1-88.

Technical Report. (1975). Quiet Clean Short-haul Experimental Engine (QCSEE) UTW fan preliminary design. NASA-CR-134842. Feb. 1, 1975. pp. 1-98.

Third Party Observations for EP Application No. EP17175088.8, filed Sep. 9, 2014, dated on Oct. 29, 2018, 2 pages.

Thulin, R.D., Howe, D.C., and Singer, I.D. (1982). Energy efficient engine: High pressure turbine detailed design report. Prepared for NASA. NASA CR-165608. pp. 1-178.

Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.

Tummers, B. (2006). DataThief III. Retreived from: https://datathief.org/DatathiefManual.pdf pp. 1-52.

Turbomeca Aubisque. Jane's Aero-engines, Aero-engines—Turbofan. Nov. 2, 2009.

Turner, M. G., Norris, A., and Veres, J.P. (2004). High-fidelity three-dimensional simulation of the GE90. NASA/TM-2004-212981. pp. 1-18.

Type Certificate Data Sheet No. E6NE. Department of Transportation Federal Aviation Administration. Jun. 7, 2002. pp. 1-10.

U.S. Appl. No. 13/342,508, filed Jan. 3, 2012, "Flexible Support Structure for a Geared Architecture Gas Turbine Engine", PA18008US.

U.S. Appl. No. 13/342,557, filed Jan. 3, 2012, "Titled Flexible Support Structure for a Geared Architecture Gas Turbine Engine".

U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.

U.S. Department of Transportation: Federal Aviation Administration Advisory Circular. Standard operating procedures for flight deck crewmembers, Dated: Feb. 27, 2003, p. 1-6 and Appendices.

U.S. Department of Transportation: Federal Aviation Administration Type Certificate Data Sheet No. E6WE. Dated: May 9, 2000. p. 1-9.

Vasudevan, A.K. and Petrovic, J.J. (1992). A comparative overview of molybedenum disilicide composites. Materials Science and Engineering, A155, 1992. pp. 1-17.

Warwick, G. (2007). Civil engines: Pratt & Whitney gears up for the future with GTF. Flight International, Nov. 2007. Retrieved Jun. 14,

(56) References Cited

OTHER PUBLICATIONS 2016 from: https://www.flightglobal.com/news/articles/civil-engines-pratt-amp-whitney-gears-up-for-the-future-with-219989/.

Waters, M.H. and Schairer, E.T. (1977). Analysis of turbofan propulsion system weight and dimensions. NASA Technical Memorandum. Jan. 1977. pp. 1-65.

Web Article, GE Aviation, GEnx-28 first engine to test, Jan. 28, 2012, Retrieved from: http://www.geaviation.com/engines/commercial/genx/2b_fett.html, 1 page.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.

Whitaker, R. (1982). ALF 502: plugging the turbofan gap. Flight International, p. 237-241, Jan. 30, 1982.

Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.

Wikipedia. Stiffness. Retrieved Jun. 28, 2018 from: https://en.wikipedia.org/wiki/Stiffness.

Wikipedia. Torsion spring. Retreived Jun. 29, 2018 from: https://en.wikipedia.org/wiki/Torsion_spring.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Willis, W.S. (1979). Quiet clean short-haul experimental engine (QCSEE) final report. NASA/CR-159473 pp. 1-289.

Winn, A. (Ed). (1990). Wide Chord Fan Club. Flight International, 4217(137). May 23-29, 1990. pp. 34-38.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Xie, M. (2008). Intelligent engine systems: Smart case system. NASA/CR-2008-215233. pp. 1-31.

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.

Zalud, T. (1998). Gears put a new spin on turbofan performance. Machine Design, 70(20), p. 104.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Zhao, J.C. and Westbrook, J.H. (2003). Ultrahigh-temperature materials for jet engines. MRS Bulletin. vol. 28(9). Sep. 2003. pp. 622-630.

* cited by examiner

FUNDAMENTAL GEAR SYSTEM ARCHITECTURE

CROSS-REFERENCE TO RELATED APPLICATION

This application is a continuation of U.S. patent application Ser. No. 16/291,392 filed on Mar. 4, 2019, which is a continuation of U.S. patent application Ser. No. 14/190,159 filed on Feb. 26, 2014, which is a continuation of International Application No. PCT/US2013/041761 filed May 20, 2013 that claims priority to U.S. Provisional Application No. 61/653,731 filed May 31, 2012 and U.S. application Ser. No. 13/557,614 filed Jul. 25, 2012, now U.S. Pat. No. 8,572,943 granted Nov. 5, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. A speed reduction device such as an epicyclical gear assembly may be utilized to drive the fan section such that the fan section may rotate at a speed different than the turbine section so as to increase the overall propulsive efficiency of the engine. The efficiency at which the gear assembly transfers power is a consideration in the development of a gear driven fan. Power or energy not transferred through the gearbox typically results in the generation of heat that is removed with a lubrication system. The more heat generated, the larger and heavier the lubrication system.

Although geared architectures can provide improved propulsive efficiency, other factors including heat removal and lubrication can detract from the improved propulsive efficiency. Accordingly, turbine engine manufacturers continue to seek further improvements to engine performance including improvements to thermal, transfer and propulsive efficiencies.

SUMMARY

A fan drive gear system for a gas turbine engine according to an exemplary embodiment of this disclosure, among other possible things includes a gear system that provides a speed reduction between a fan drive turbine and a fan. A lubrication system configures to provide lubricant to the gear system and to remove thermal energy produced by the gear system. The lubrication system includes a capacity for removing thermal energy greater than zero and less than about 2% of power input into the gear system during operation of the engine.

In a further embodiment of any of the foregoing fan drive gear systems, the gear system transfers power input from the fan drive turbine to the fan at an efficiency greater than about 98% and less than 100%.

In a further embodiment of any of the foregoing fan drive gear systems, the lubrication system includes a capacity for removing thermal energy equal to less than about 1% of power input into the gear system.

In a further embodiment of any of the foregoing fan drive gear systems, the lubrication system includes a main lubrication system configured to provide lubricant to the gear system and an auxiliary lubrication system configured to provide lubricant to the gear system responsive to an interruption of lubricant flow from the main lubrication system.

In a further embodiment of any of the foregoing fan drive gear systems, the gear system is flexibly supported for movement relative to a static structure of the engine.

In a further embodiment of any of the foregoing fan drive gear systems, a load limiter is configured to limit movement of the gear system relative to the static structure of the engine responsive to an unbalanced condition.

In a further embodiment of any of the foregoing fan drive gear systems, the gear system includes a sun gear that is configured to be driven by the fan drive turbine, a non-rotatable carrier, a plurality of star gears that are supported on the carrier and that are configured to be driven by the sun gear, and a ring gear circumscribing the plurality of star gears.

In a further embodiment of any of the foregoing fan drive gear systems, includes a first flexible coupling between an input shaft that is configured to be driven by the fan drive turbine and the sun gear, and a second flexible coupling between a fixed structure and the carrier.

In a further embodiment of any of the foregoing fan drive gear systems, the gear system includes a sun gear that is configured to be driven by the fan drive turbine, a rotatable carrier, a plurality of planet gears that are supported on the carrier and that are configured to be driven by the sun gear, and a ring gear circumscribing the plurality of planet gears.

In a further embodiment of any of the foregoing fan drive gear systems, includes a first flexible coupling between an input shaft that is configured to be driven by the fan drive turbine and the sun gear, and a second flexible coupling between a fixed structure and the ring gear.

A gas turbine engine according to an exemplary embodiment of this disclosure, among other possible things includes a fan including a plurality of fan blades rotatable about an axis, a fan drive turbine, a gear system that provides a speed reduction between the fan drive turbine and the fan, the gear system configured to transfer power input from the fan drive turbine to the fan at an efficiency greater than about 98% and less than 100%, and a lubrication system configured to provide lubricant to the gear system and to remove thermal energy from the gear system produced by the gear system during operation of the engine.

In a further embodiment of any of the foregoing gas turbine engines, the lubrication system includes a capacity for removing thermal energy equal to less than about 2% of power input into the gear system during operation of the engine.

In a further embodiment of any of the foregoing gas turbine engines, the lubrication system includes a capacity for removing thermal energy equal to less than about 1% of power input into the gear system during operation of the engine.

In a further embodiment of any of the foregoing gas turbine engines, the lubrication system includes a main lubrication system configured to provide lubricant to the gear system and an auxiliary lubrication system configured to provide lubricant to the gear system responsive to an interruption of lubricant flow from the main lubrication system.

In a further embodiment of any of the foregoing gas turbine engines, the gear system includes a sun gear that is configured to be driven by the fan drive turbine, a non-rotatable carrier, a plurality of star gears that are supported on the carrier and that are configured to be driven by the sun gear, and a ring gear circumscribing the plurality of star gears. The gear system is flexibly supported for accommodating movement relative to an engine static structure.

In a further embodiment of any of the foregoing gas turbine engines, includes a first flexible coupling between an input shaft that is configured to be driven by the fan drive turbine and the sun gear, and a second flexible coupling between the engine static structure and the carrier.

In a further embodiment of any of the foregoing gas turbine engines, the gear system includes a sun gear that is configured to be driven by the fan drive turbine, a rotatable carrier, a plurality of planet gears that are supported on the carrier and that are configured to be driven by the sun gear, and a ring gear circumscribing the plurality of planet gears. The gear system is flexibly supported for accommodating movement relative to an engine static structure.

In a further embodiment of any of the foregoing gas turbine engines, includes a first flexible coupling between an input shaft that is configured to be driven by the fan drive turbine and the sun gear, and a second flexible coupling between the engine static structure and the ring gear.

In a further embodiment of any of the foregoing gas turbine engines, the gear system includes a gear reduction having a gear ratio greater than about 2.3.

In a further embodiment of any of the foregoing gas turbine engines, the fan delivers a first portion of air into a bypass duct and a second portion of air into a compressor of the gas turbine engine. A bypass ratio, which is defined as the first portion divided by the second portion, is greater than about 10.0.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
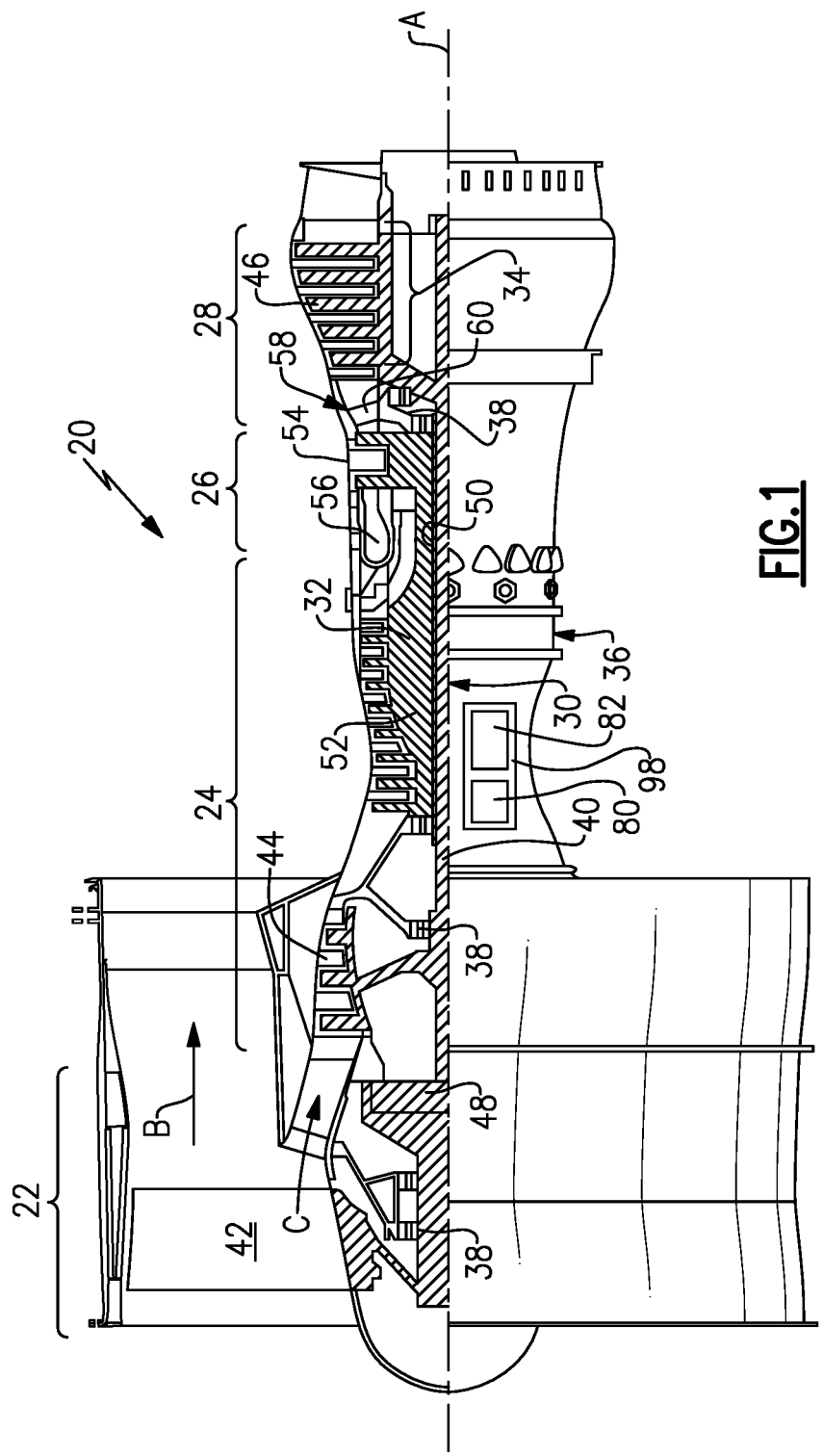
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram °R)/518.7)^{0.5}]$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example gas turbine engine includes a lubrication system 98. The lubrication system 98 provides lubricant flow to the rotating components of the gas turbine engine including the bearing assemblies 38 and the geared architecture 48. The lubrication system 98 further provides for the removal of heat generated in the various bearing systems and the geared architecture 48.

The example lubrication system 98 includes a main system 80 that provides lubrication during normal operating conditions of the gas turbine engine. An auxiliary system 82 is also included to supplement operation of the main lubrication system 80. The size and weight of the lubrication system 90 is directly related to its capacity for removing heat from the geared architecture 48. The greater the need for removal of heat, the larger and heavier the lubrication system 98 becomes. The amount of heat generated by the geared architecture 48 is therefore an important consideration in the configuration of a fan drive gear system.

Figure 2:
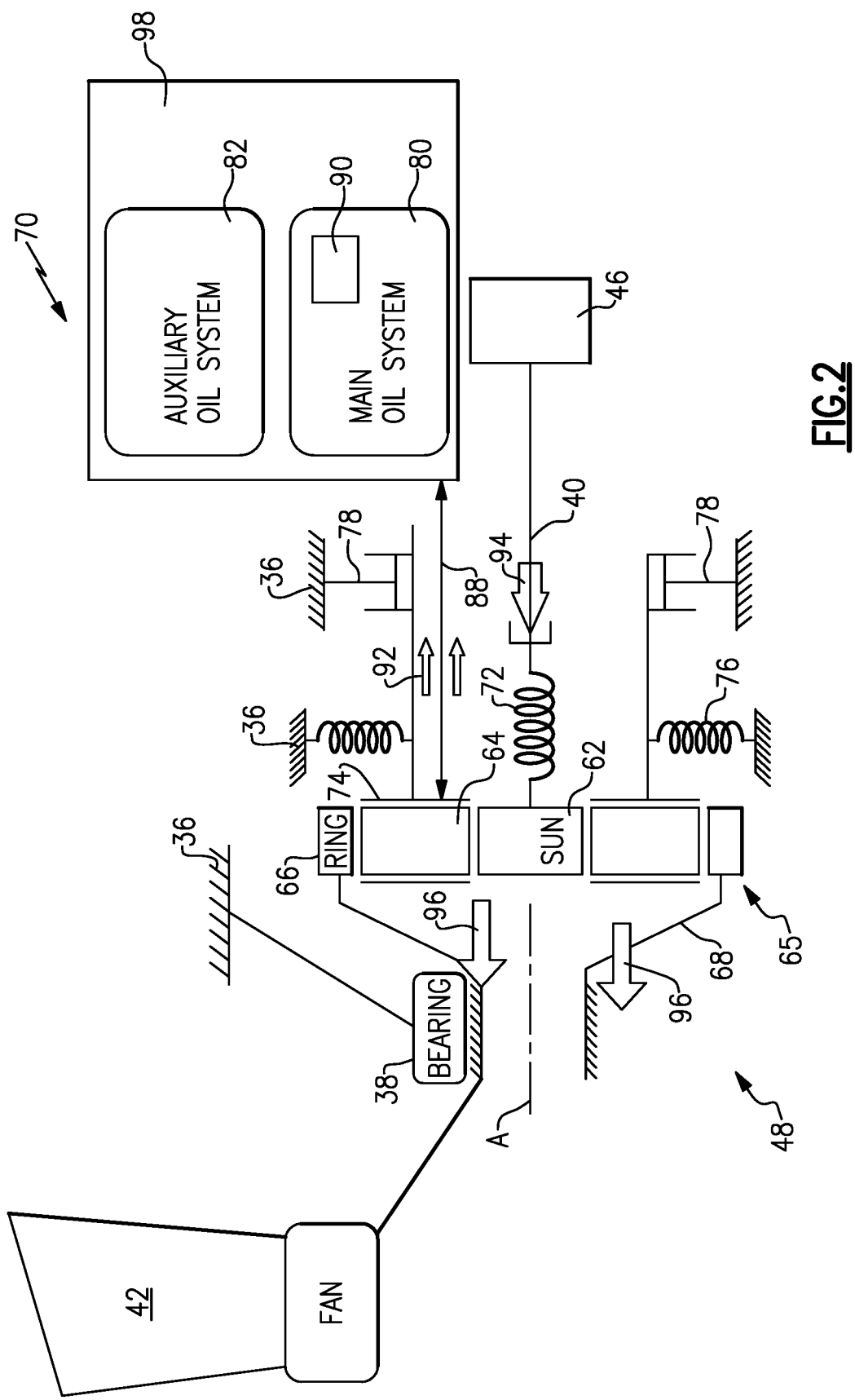
FIG. 2 is a schematic view of an example fan drive gear system including star epicyclical geared architecture.

Referring to FIG. 2 with continued reference to FIG. 1, the example geared architecture 48 is part of a fan drive gear system 70. The example geared architecture 48 comprises a gear assembly 65 that includes a sun gear 62 driven by a fan drive turbine 46. In this example, the fan drive turbine is the low pressure turbine 46. The sun gear 62 in turn drives intermediate gears 64 mounted on a carrier 74 by journal bearings. The carrier 74 is grounded to the static engine structure 36 and therefore the intermediate gears 64 do not orbit about the sun gear 62. The intermediate gears 64 intermesh and drive a ring gear 66 coupled to a fan shaft 68 to drive the fan 42.

The gear assembly 65 is flexibly mounted such that it may be isolated from vibrational and transient movement that could disturb alignment between the gears 62, 64 and 66. In this example, flexible mounts 76 support the carrier 74 and accommodate relative movement between the gear assembly 65 and the static structure 36. The example flexible mount 76 includes a spring rate that accommodates deflections that occur during normal operation of the fan drive gear system 70.

Power input through the inner shaft 40 of the fan drive turbine 46 is transmitted through a flexible coupling 72. The flexible coupling 72 also includes a spring rate that allows a defined amount of deflection and misalignment such that components of the gear assembly 65 are not driven out of alignment.

Although some relative movement is compensated by the flexible coupling 72 and the flexible mounts 76, movement beyond a desired limitation can detrimentally affect meshing engagement between the gears and therefore a load limiting device 78 is provided as part of the gear box mounting structure. The load limiter 78 constrains movement of the gear box 65. The limiter 78 further provides a stop that reacts to unbalanced loads on the gear box 65. Accordingly, the limiter prevents radial unbalanced loads and/or torsional overloads from damaging the gas turbine engine 20.

The example fan drive gear system 70 is supported by a lubrication system 98. The lubrication system 98 provides for lubrication and cooling of the gears 62, 64 and 66 along with bearings supporting rotation of the gears. It is desirable to circulate lubricant as quickly as possible to maintain a desired temperature. Power transmission efficiency through the gear box 65 is detrimentally affected by elevated temperatures.

In this example, the lubricant system 98 includes a main system 80 that provides the desired lubricant flow through a plurality of conduits schematically illustrated by the line 88 to and from the gear box 65. The main oil system 80 also transmits heat, schematically by arrows 92, away from the gear box 65 to maintain a desired temperature.

The lubrication system 98 also includes the auxiliary oil system 82 that supplies oil flow to the gear box 65 in response to a temporary interruption in lubricant flow from the main oil system 80.

The efficiency of the example gear box 65 and overall geared architecture 48 is a function of the power input, schematically indicated by arrow 94, through the shaft 40 relative to power output, schematically indicated by arrows 96, to the fan shaft 68. Power input 94 compared to the amount of power output 96 is a measure of gear box efficiency. The example gear box 65 operates at an efficiency of greater than about 98%. In another disclosed example, the example gear box 65 operates at an efficiency greater than about 99%.

The disclosed efficiency is a measure of the amount of power 94 that is specifically transferred to the fan shaft 68 to rotate the fan 42. Power that is not transmitted through the gear box 65 is lost as heat and reduces the overall efficiency of the fan drive gear system 70. Any deficit between the input power 94 and output power 96 results in the generation of heat. Accordingly, in this example, the deficit of between 1-2% between the input power 94 and output power 96 generates heat. In other words, between 1% and 2% of the input power 94 is converted to heat energy that must be accommodated by the lubrication system 98 to maintain a working lubricant temperature within operational limits.

The example lubricant system 98 provides for the removal of thermal energy equal to or less than about 2% of the input power 94 from the low pressure turbine 46. In another non-limiting embodiment of the example fan drive gear system 70, the efficiency of the gear box 65 is greater than about 99% such that only 1% of power input from the low pressure turbine 46 is transferred into heat energy that must be handled by the lubricant system 98.

As appreciated, the larger the capacity for handling and removing thermal energy, the larger and heavier the lubricant system 98. In this example, the main oil system includes a heat exchanger 90 that accommodates heat 92 that is generated within the gear box 65. The heat exchanger 90 is an example of one element of the lubrication system 98 that is scaled to the desired capacity for removing thermal energy. As appreciated, other elements, such as for example lubricant pumps, conduit size along with overall lubricant quantity within the lubrication system 98 would also be increased in size and weight to provide increased cooling capacity. Accordingly, it is desirable to increase power transfer efficiency to reduce required overall heat transfer capacity of lubrication system 98.

In this example, the high efficiency of the example gear box 65 enables a relatively small and light lubricant system 98. The example lubricant system 98 includes features that can accommodate thermal energy generated by no more than about 2% of the input power 94. In other words, the lubrication system 98 has an overall maximum capacity for removing thermal energy equal to no more than about 2% of the input power provided by the low pressure turbine 46.

Greater amounts of capacity for removal of thermal energy results in an overall increase in the size and weight of the lubrication system 98. Lubrication systems that are required to remove greater than about 2% of input power 94 require larger lubricant systems 98 that can detrimentally impact overall engine efficiency and detract from the propulsion efficiencies provided by the reduction in fan speed.

Figure 3:
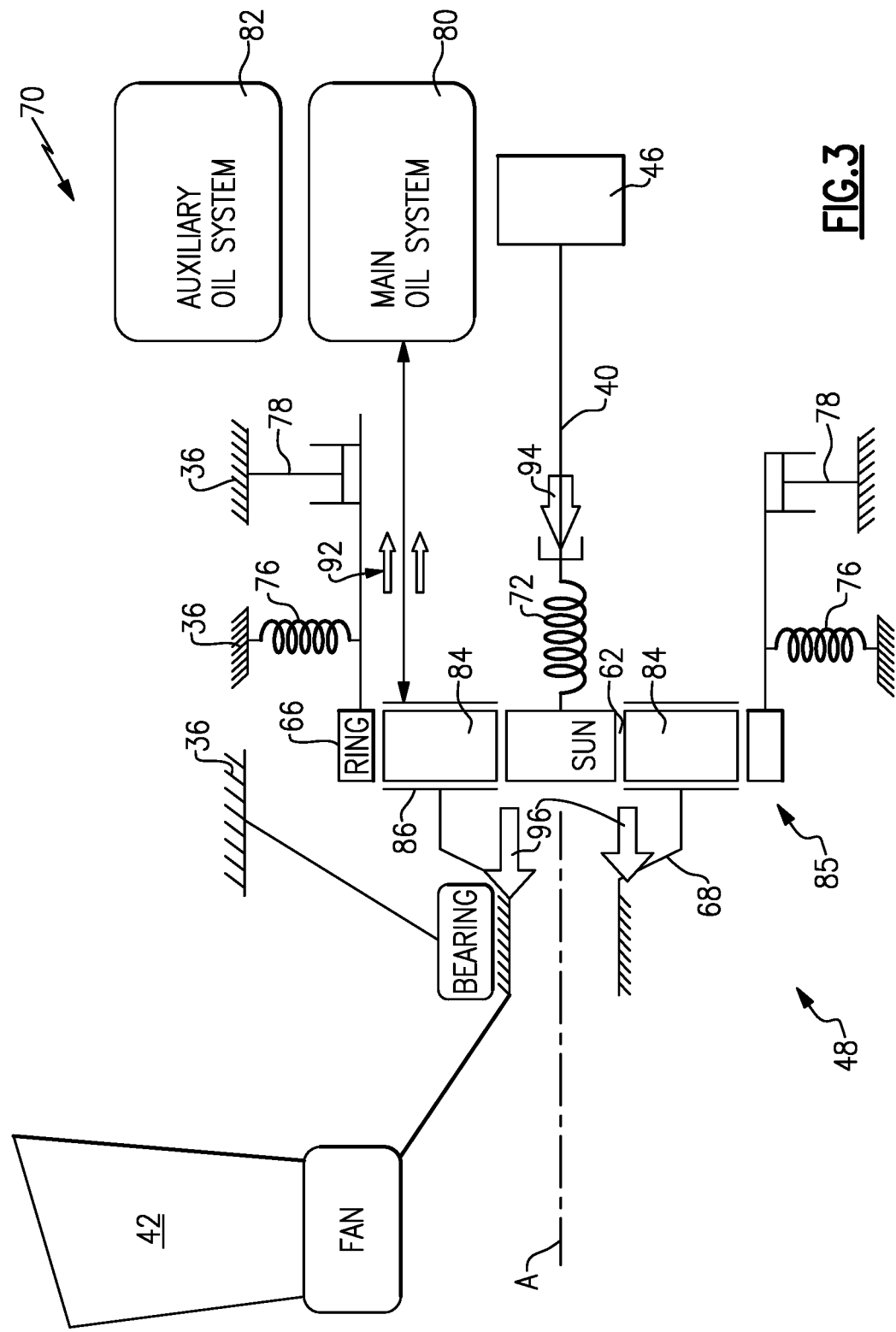
FIG. 3 is a schematic view of an example fan drive gear system including planetary epicyclical geared architecture.

Referring to FIG. 3 with continued reference to FIG. 1, another example epicyclical gear box 85 is disclosed and comprises a planetary configuration. In a planetary configuration, planet gears 84 are supported on a carrier 86 that is rotatable about the engine axis A. The sun gear 62 remains driven by the inner shaft 40 and the low pressure turbine 46. The ring gear 66 is mounted to a fixed structure 36 such that it does not rotate about the axis. Accordingly, rotation of the sun gear 62 drives the planet gears 84 within the ring gear 66. The planet gears 84 are supported on the rotatable carrier 86 that in turn drives the fan shaft 68. In this configuration, the fan shaft 68 and the sun gear 62 rotate in a common direction, while the planet gears 84 individually rotate in a direction opposite to the sun gear 62 but collectively rotate about the sun gear 62 in the same direction as the rotation of the sun gear 62.

The example planetary gear box illustrated in FIG. 3 includes the ring gear 66 that is supported by flexible mount 76. The flexible mount 76 allows some movement of the gearbox 85 to maintain a desired alignment between meshing teeth of the gears 62, 84, 66. The limiter 78 prevents movement of the planetary gear box 85 beyond desired limits to prevent potential damage caused by radial imbalances and/or torsional loads.

The example low pressure turbine 46 inputs power 94 to drive the gear box 85. As in the previous example, the example gear box 85 transmits more than about 98% of the input power 94 to the fan drive shaft 68 as output power 96. In another example, the gear box 85 transmits more than about 99% of the input power 94 to the fan drive shaft 68 as output power 96.

The difference between the input power 94 and the output power 96 is converted into heat energy that is removed by the lubrication system 98. In this example, the lubrication system 98 has a capacity of removing no more heat 92 than is generated by about 2% of the input power 94 from the low pressure turbine 46. In another example. The lubrication system 98 has a capacity of removing no more heat 92 than is generated by about 1% of the input power 94. Accordingly, the efficiency provided by the example gear box 85 enables the lubrication system 98 to be of size that does not detract from the propulsive efficiency realized by turning the fan section 22 and low pressure turbine 46 at separate and nearer optimal speeds.

Accordingly, the example fan drive gear system provides for the improvement and realization of propulsive efficiencies by limiting losses in the form of thermal energy, thereby enabling utilization of a lower capacity and sized lubrication system.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
   a fan including a plurality of fan blades rotatable about an axis;
   a compressor section;
   a combustor in fluid communication with the compressor section;
   a fan drive turbine in communication with the combustor, the fan drive turbine comprising an inlet having an inlet pressure, an outlet prior to any exhaust nozzle and having an outlet pressure, a pressure ratio of the inlet pressure to the outlet pressure greater than five (5);
   a gear system providing a speed reduction between the fan drive turbine and the fan and transferring power input from the fan drive turbine to the fan at an efficiency greater than 98%, wherein the gear system further comprises a gear reduction ratio of greater than 2.3;
   a lubrication system providing lubricant to rotating components of the engine including the gear system and removing thermal energy from the lubricant, wherein the lubrication system comprises a first lubrication system providing lubricant flow to the gear system, and a second lubrication system supplementing operation of the first lubrication system by providing supplementary lubricant flow to the gear system in response to an interruption in lubricant flow from the first lubrication system; and a second turbine in communication with the combustor, wherein the second turbine is an at least a two stage turbine.

2. The gas turbine engine recited in claim 1, wherein a ratio between the number of fan blades and the number of fan drive turbine rotors is between 3.3 and 8.6.

3. The gas turbine engine recited in claim 2, wherein the plurality of fan blades is less than twenty (20).

4. The gas turbine engine recited in claim 3, further comprising a low corrected fan tip speed less than about 1150 ft/second, wherein the low corrected fan tip speed is an actual fan tip speed at an ambient temperature divided by [(Tram ° R)/518.7)0.5], where T represents the ambient temperature in degrees Rankine.

5. The gas turbine engine recited in claim 3, wherein the gear system comprises a sun gear, a rotatable carrier, a plurality of planet gears supported on the carrier and driven by the sun gear, and a ring gear circumscribing the plurality of planet gears.

6. The gas turbine engine recited in claim 5, further comprising a mid-turbine frame between the fan drive turbine and the second turbine, the mid-turbine frame including at least one vane in a core airflow path functioning as an inlet guide vane for the fan drive turbine.

7. The gas turbine engine recited in claim 6, further comprising a gear support system including a spring rate that allows a defined amount of deflection and misalignment among at least some of the plurality of gears of the gear system.

8. The gas turbine engine recited in claim 7, wherein the gear support system includes a mount flexibly supporting the gear system relative to a static structure of the engine.

9. The gas turbine engine recited in claim 8, further comprising an input shaft arranged in a driving relationship to the fan drive turbine, wherein the gear support system includes a flexible support structure supporting at least one gear of the gear system relative to the input shaft.

10. The gas turbine engine recited in claim 9, wherein the mount extends radially from a static structure of the engine with respect to a central axis to accommodate radial movement between the gear system and the static structure.

11. A gas turbine engine comprising:
a fan including less than twenty (20) fan blades rotatable about an axis;
a compressor section;
a combustor in communication with the compressor section;
a bypass ratio greater than ten (10), wherein the bypass ratio is defined as the portion of air delivered around the compressor section divided by the amount of air delivered into the compressor section;
a fan drive turbine in communication with the combustor, the fan drive turbine comprising an inlet having an inlet pressure, an outlet prior to any exhaust nozzle and having an outlet pressure, a pressure ratio of the inlet pressure to the outlet pressure greater than five (5), and a ratio of between the number of fan blades and a number of fan drive turbine rotors is between 3.3 and 8.6;
a bearing system supporting rotation of an inner shaft driven by the fan drive turbine and an outer shaft driven by a second turbine;
a fan drive gear system providing a speed reduction between the fan drive turbine and the fan of greater than 2.3, the fan drive gear system transferring power input from the fan drive turbine to the fan at an efficiency greater than 98% and less than 100%;
a lubrication system circulating lubricant to at least the bearing system and the fan drive gear system, the lubrication system has a maximum capacity for removing thermal energy from the lubricant equal of no more than 2% of power input into the fan drive gear system by the fan drive turbine during operation of the engine.

12. The gas turbine engine recited in claim 11, wherein the second turbine is a two stage turbine in communication with the combustor.

13. The gas turbine engine recited in claim 12, wherein the fan drive gear system comprises a sun gear, a rotatable carrier, a plurality of planet gears supported on the carrier and driven by the sun gear, and a ring gear circumscribing the plurality of planet gears.

14. The gas turbine engine recited in claim 13, further comprising a mid-turbine frame between the fan drive turbine and the second turbine, the mid-turbine frame including at least one vane in a core airflow path functioning as an inlet guide vane for the fan drive turbine.

15. The gas turbine engine recited in claim 11, further comprising a low corrected fan tip speed less than 1150 ft/second, wherein the low corrected fan tip speed is an actual fan tip speed at an ambient temperature divided by [(Tram ° R)/518.7)0.5], where T represents the ambient temperature in degrees Rankine.

16. The gas turbine engine recited in claim 14, wherein the lubrication system has a maximum capacity for removing thermal energy from the lubricant equal to no more than 1% of power input into the fan drive gear system by the fan drive turbine during operation of the engine.

17. The gas turbine engine recited in claim 16, wherein the lubrication system comprises a first lubrication system providing lubricant flow to the fan drive gear system and the at least one bearing system, and a second lubrication system that supplies lubricant flow to the fan drive gear system in response to an interruption in lubricant flow from the first lubrication system.

18. A gas turbine engine comprising:
a fan including a plurality of fan blades rotatable about an axis;
a compressor section axially aft of the fan;
a bypass ratio greater than ten (10), the bypass ratio being defined as the portion of air delivered around the compressor section divided by the amount of air delivered into the compressor section;
a combustor in fluid communication with the compressor section;
a turbine section including a fan drive turbine and a second turbine in communication with the combustor, wherein a ratio between the number of fan blades and the fan drive turbine rotors is between 3.3 and 8.6;
a fan drive gear system providing a speed reduction between the fan drive turbine and the fan and transferring power input from the fan drive turbine to the fan at an efficiency greater than 98% and less than 100%, wherein the fan drive gear system further comprises a gear reduction ratio of greater than 2.3;
an input shaft arranged in a driving relationship to the fan drive turbine;
a gear support system including a flexible support structure supporting at least one gear of the gear system relative to the input shaft;
a lubrication system providing lubricant to rotating components of the engine including the gear system and removing thermal energy from the lubricant, the lubrication system has a maximum capacity for removing thermal energy from the lubricant equal of no more than 2% of power input into the fan drive gear system by the fan drive turbine during operation of the engine, wherein the lubrication system comprises a first lubrication system providing lubricant flow to the fan drive gear system and a second lubrication system supplementing operation of the first lubrication system by providing supplementary lubricant flow to at least the fan drive gear system in response to an interruption in lubricant flow from the first lubrication system.

19. The gas turbine engine recited in claim 18, further comprising a mid-turbine frame between the fan drive turbine and the second turbine, the mid-turbine frame including at least one vane in a core airflow path functioning as an inlet guide vane for the fan drive turbine and the second turbine is a two-stage second turbine.

\* \* \* \* \*